(12) United States Patent
Needham et al.

(10) Patent No.: US 10,178,830 B2
(45) Date of Patent: Jan. 15, 2019

(54) TREE LOCATION SENSING SYSTEM AND PROCESS FOR AGRICULTURAL TREE HARVESTING

(71) Applicant: ORCHARD MACHINERY CORPORATION, Yuba City, CA (US)

(72) Inventors: Duane Lee Needham, San Francisco, CA (US); Brian Michael Andersen, Yuba City, CA (US); Tyler Calvin Niday, Yuba City, CA (US); Donald Paul Mayo, Live Oak, CA (US)

(73) Assignee: Orchard Machinery Corporation, Yuba City, CA (US)

( * ) Notice: Subject to any disclaimer, the term of this patent is extended or adjusted under 35 U.S.C. 154(b) by 0 days.

(21) Appl. No.: 14/611,259

(22) Filed: Feb. 1, 2015

(65) Prior Publication Data
US 2016/0219786 A1    Aug. 4, 2016

(51) Int. Cl.
*A01D 46/26*    (2006.01)

(52) U.S. Cl.
CPC .................................. *A01D 46/26* (2013.01)

(58) Field of Classification Search
CPC ................ A01D 46/26; A01D 91/04
See application file for complete search history.

(56) References Cited

U.S. PATENT DOCUMENTS

| 3,163,458 | A |   | 12/1964 | Brandt, Jr. | |
| 3,220,268 | A |   | 11/1965 | Brandt, Jr. | |
| 3,221,567 | A |   | 12/1965 | Brandt, Jr. | |
| 3,318,629 | A |   | 5/1967  | Brandt, Jr. | |
| 5,901,918 | A | * | 5/1999  | Klerelid ............... | B65H 18/10 162/118 |
| 6,658,834 | B1 | * | 12/2003 | Mayo ................... | A01D 46/26 56/10.2 R |
| 7,320,349 | B2 | * | 1/2008  | Gatz .................... | A01G 23/08 144/335 |
| 7,757,471 | B2 |   | 7/2010  | Mayo | |
| 9,072,224 | B1 | * | 7/2015  | Flora ................... | A01D 46/26 |
| 2010/0095644 | A1 | * | 4/2010 | Mayo ................... | A01D 46/26 56/10.2 R |

* cited by examiner

*Primary Examiner* — Robert E Pezzuto
*Assistant Examiner* — Adam J Behrens
(74) *Attorney, Agent, or Firm* — Lewis Brisbois Bisgaard & Smith LLP

(57) ABSTRACT

An improved system and method for sensing the location of a tree trunk relative to an orchard harvester machine that generally includes a distance sensor, a vegetation pushing device that functions to displace vegetation, such as low-hanging tree branches, grass or other upward-growing vegetation which may obscure the sensor's detection of the tree trunk, and a controller in communication with the distance sensor, which system may be incorporated into existing tree harvesters such as those with mechanized tree shakers, and may also be incorporated into a catching frame vehicle or a nut sweeping vehicle.

9 Claims, 11 Drawing Sheets

TREE LOCATION SENSING SYSTEM AND PROCESS FOR AGRICULTURAL TREE HARVESTING

FIELD OF INVENTION

The present invention relates generally to agricultural tree harvest vehicles including tree shakers which utilize shaker heads to remove nuts and fruit from trees, and to assist vehicles which catch or gather the crop, collectively referred to as harvester vehicles. More particularly, the present invention relates to sensors and algorithms enabling harvester vehicles to detect and reference locations of trees for automated or partially automated vehicle navigation, clamping, shaking, catching, and sweeping.

BACKGROUND OF INVENTION

When the harvest of a particular orchard crop occurs, the specific crops on each of thousands of trees become ripe at about the same time. Harvest of these thousands of trees is a time consuming process which must be completed quickly while the crop is optimally ripe, and it is therefore advantageous to create systems that complete the harvesting operations as quickly as possible. The conventional solution for rapidly harvesting tree crops include mechanized tree harvesters which, through conventional electro-hydraulic control systems shake nut and fruit trees to cause the crop of nuts or fruit to drop off of the tree. Such harvesters generally are driven to a location proximate to a tree to be harvested, and a shaker head extends towards the tree. The shaker head generally includes movable jaws with pads that clamp the tree and a motor that powers the shaking process. Mechanized harvesters are well known in the art, and are described, for example, in U.S. Pat. Nos. 3,163,458; 3,220,268; 3,221,567; and 3.318.629.

When it is desired that the crop not touch the ground, harvest equipment with catching frames are used. This harvest method typically operates with a pair of harvesters: a shaker-equipped vehicle with a catching frame which operates on one side of a tree and a crop receiving vehicle with a catching frame on the other side of the tree. Both harvest vehicles must propel to and stop at a location alongside each of the trees to be harvested in order to catch the crop.

Operation of a mechanized tree harvester requires skill and stamina, due to repeated starting and stopping the vehicle adjacent to each tree, extending the clamping arm to a proper distance, and shaking each tree for a desired duration. In order to relieve the operator of some of this laborious operation, partial automation systems that use sensors and controls on tree harvesters have been developed. For instance, tree shaking machines with sensors and automation controllers are described in U.S. Pat. Nos. 6,658,834 and 7,757,471, both of which are incorporated by reference herein in their entirety for all purposes.

U.S. Pat. No. 6,658,834 ("the '834 patent") describes a tree sensing device, mounted upon a harvester and controlled by a conventional electro-hydraulic controller. Shaker head control parameters including a desired predetermined tree distance are input into a programmable controller. When the harvester is driven to a location next to a tree, the operator initiates an automated tree shaking cycle in which a tree sensor provides signals representative of the distance from the sensor to the tree as input signals to the controller. The controller then calculates a measured distance from the tree to the harvester and compares the measured distance to the predetermined tree distance and provides shaker head control signals to cause the shaker head to move outward towards the tree and halt when the measured distance is equal to or less than the predetermined distance. The control system then provides control signals to the shaker head components to cause the shaker head to clamp the tree, to shake the tree, to unclamp the tree and/or to move the shaker head back to the harvester. Further input signals to the controller include desired engine RPM signals for controlling the engine speed and tree shaking time signals for controlling the duration of the tree shaking.

U.S. Pat. No. 7,757,471 ("the '471 patent") describes a tree harvester control system which incorporates the sensor and automated shaking process of the '834 patent while automatically steering, propelling, and/or stopping the harvester machine to shake each tree. The system incorporates a programmable controller which calculates the distances from machine to tree and from tree to tree. The controller utilizes the relative tree locations to calculate the angular adjustment needed and turns a steering caster the desired angle in order to point the shaker in the correct direction. The controller then causes the harvester to move to the recalculated position and the cycle then repeats itself.

While the systems described in the '834 patent and the '471 patent sense and determine tree location relative to a harvester, the current system and method provides significant improvements to those harvesters, particularly regarding tree location sensing and determination technology. The above patents discuss several types of tree sensors including lasers and describe using an ultrasonic tree sensor mounted directly on the shaker head. However, years of use and evaluation have shown that tree branches can interfere with an ultrasonic measurement of the tree trunk distance and the very high vibration of the shaker head exceeds the maximum acceleration most sensors can tolerate causing inaccurate measurements and reducing the operational life of the sensors. Further, the dusty and unpredictable environment introduces challenges to any sensor used. Because accurate determination of tree locations are important for automated shaking and harvester navigation, there is a need for mechanisms and systems to consistently make accurate tree distance and location calculations.

Due to the above highlighted concerns in the field of agricultural tree harvesting, a need exists for refinements and improvements to tree sensing and location referencing technology. While various implementations of partial harvester automation have been developed, no known system has emerged that encompasses the features hereafter presented in accordance with aspects of the present invention.

SUMMARY OF INVENTION

The present invention improves upon tree sensing and location technology by providing means for accurate measurement of tree locations relative to a harvester.

A tree distance sensor apparatus, such as a distance sensor in the form of a laser or imaging camera, is mounted on a harvester. The sensor locates the trunk of a tree and provides signals representative of the distance from the tree to the sensor to a controller that is in communication with the distance sensor.

In one embodiment, means are provided for an improved system for sensing the location of a tree trunk relative to an orchard harvester machine through use of a vegetation pushing device. The vegetation pushing device displaces vegetation including low-hanging tree branches, grass or other upward-growing vegetation which may obscure the sensor's detection of the tree trunk. The vegetation pushing device may be in the form of a bar, an angled plate or of a tube through which air flows to prevent dust from obscuring a laser sensor's detection of the tree trunk.

In another embodiment, means are also provided for clearing dust from the optical view of the sensor. In this embodiment, the distance sensor apparatus further comprises a fan to source flowing air, and tubing to direct the air flow over the optical line of the distance sensor. The flowing air may be directed through a nozzle, and the nozzle may direct air flow in the shape of a cone. The air stream flowing from the fan maintains a clear optical path for the laser beam emanating from the sensor apparatus to a proximate tree trunk.

The tree sensing device and the vegetation pushing device may be mounted anywhere on the harvesting vehicle, such as, but not limited to, on an extendable shaker clamp, on a movable boom, or on the catching frame structure of a harvester vehicle. It may be incorporated into existing tree harvesters such as those with mechanized tree shakers, and may also be incorporated into a catching frame vehicle or a nut sweeping vehicle.

In several embodiments, the controller in communication with the distance sensor may continuously log sensor output and compare the measured pattern to any of multiple, pre-determined filter patterns of various sized tree trunks. The controller may further use known tree spacing or may use dynamically measured tree spacing to improve performance of the trunk detection algorithm. The controller may also regulate the pitch and roll of the extending shaker head in order to align the physical vegetation pushing device of the present invention with the distance sensor. The controller in communication with the distance sensor may comprise a programmable controller or a network of programmable controllers. The controller may use the tree location or multiple tree locations as reference(s): (1) to propel and stop the harvester machine in relation to a predetermined distance proximate to each tree to be harvested; (2) to determine when to lift one or more sweeper brushes in order to minimize disturbance of dust; and/or (3) to calculate a desired course over ground for automatic steering of the harvester. The controller may also utilize measurements from global positioning system receivers, accelerometers, gyroscopes, wheel encoders, steering cylinder potentiometers, and other sensors to navigate a harvester along the desired course over ground.

These and other embodiments, features, aspects, and advantages of the invention will become better understood with regard to the following description, appended claims and accompanying drawings.

BRIEF DESCRIPTION OF THE DRAWINGS

The foregoing aspects and the attendant advantages of the present invention will become more readily appreciated by reference to the following detailed description, when taken in conjunction with the following accompanying drawings.

Figure 1:
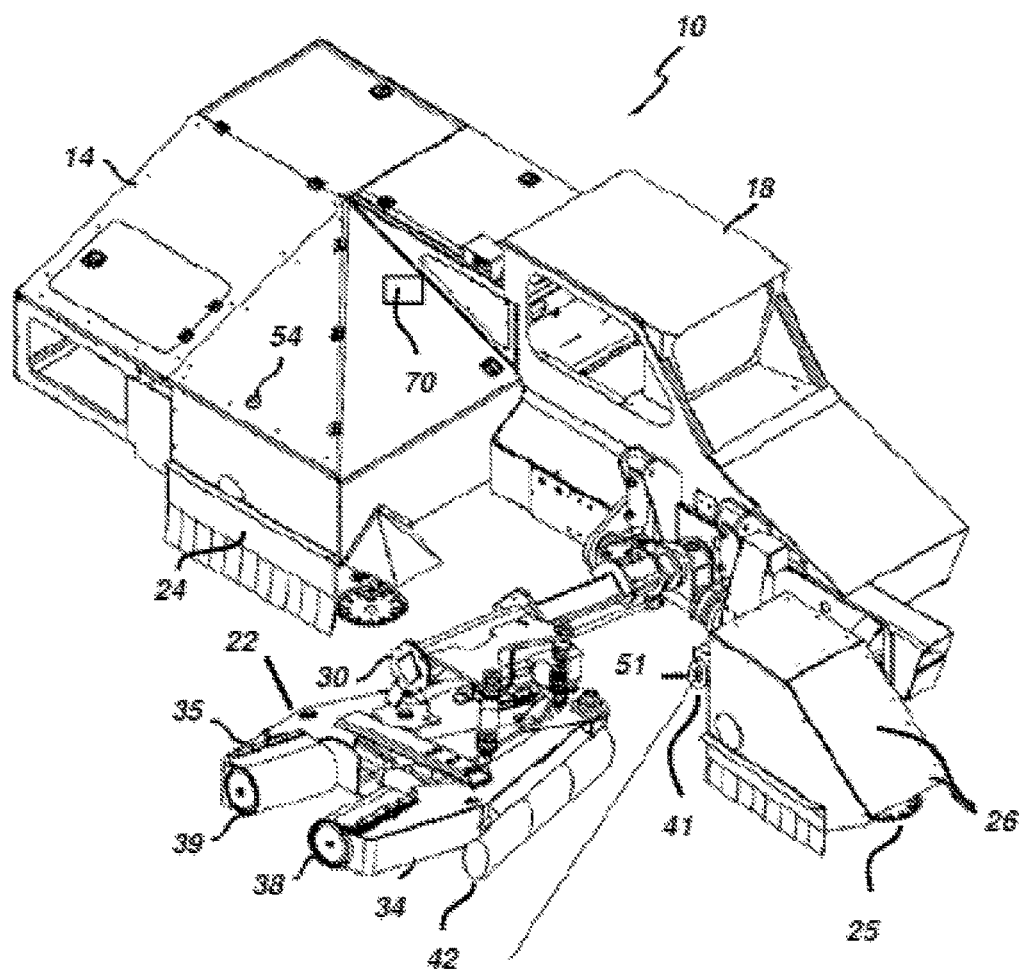
FIG. 1 is a perspective view of a mechanized tree shaker with an embodiment of the distance sensor apparatus and the vegetation pushing device.

Reference symbols or names are used in the Figures to indicate certain components, aspects or features shown therein. Reference symbols common to more than one Figure indicate like components, aspects or features shown therein.

DETAILED DESCRIPTION

Reference now will be made in detail to embodiments of the invention, one or more of which are illustrated in the drawings. Each embodiment is provided by way of explanation of the invention, not limitation of the invention. It will be apparent to those skilled in the art that various modifications and variations can be made to the present embodiments without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

The present invention is directed to agricultural tree harvesters having a system for efficiently and effectively sensing the location of a tree trunk proximate to the harvester. The system includes a distance sensor, a surrounding sensor apparatus, and a controller in communication with the distance sensor. It also preferably includes a vegetation pushing member or device which is positioned on the harvester, preferably in a location where the pushing device is able to create a clear optical path for the distance sensor. Tree location measurements may be used by the controller in the automation of tree harvesting processes, eliminating or reducing the need for the operator to steer or manually steer, propel or stop the harvester.

It should be appreciated that, although the system and sensor apparatus embodiments are primarily described herein are with reference to orchard harvest machines including shakers, catching frame receivers, and nut sweepers, they may generally be utilized in any vehicle which operates under a tree canopy, including those which operate where global positioning system (GPS) signals are not reliable, and, proximate tree trunks exist. For example, the disclosed sensor system may be incorporated into a device and/or system configured for other types of harvesting equipment. As another example, the disclosed sensor systems may be configured to spray, mow, till, prune, or conduct any other operation associated with orchard crop production.

Figure 2:
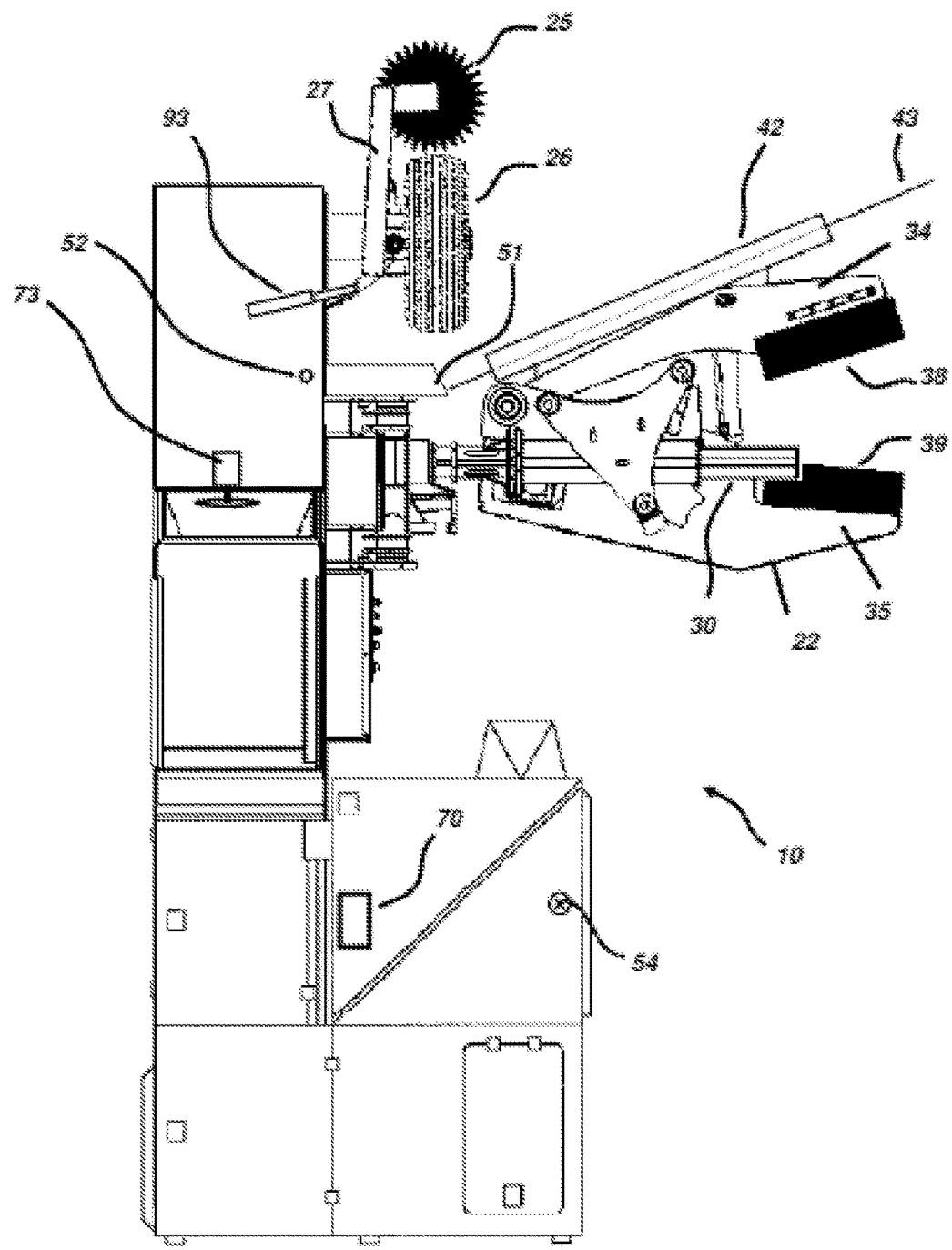
FIG. 2 is a top view of the FIG. 1 mechanized tree shaker, with its steering wheel cover removed.
Figure 3:
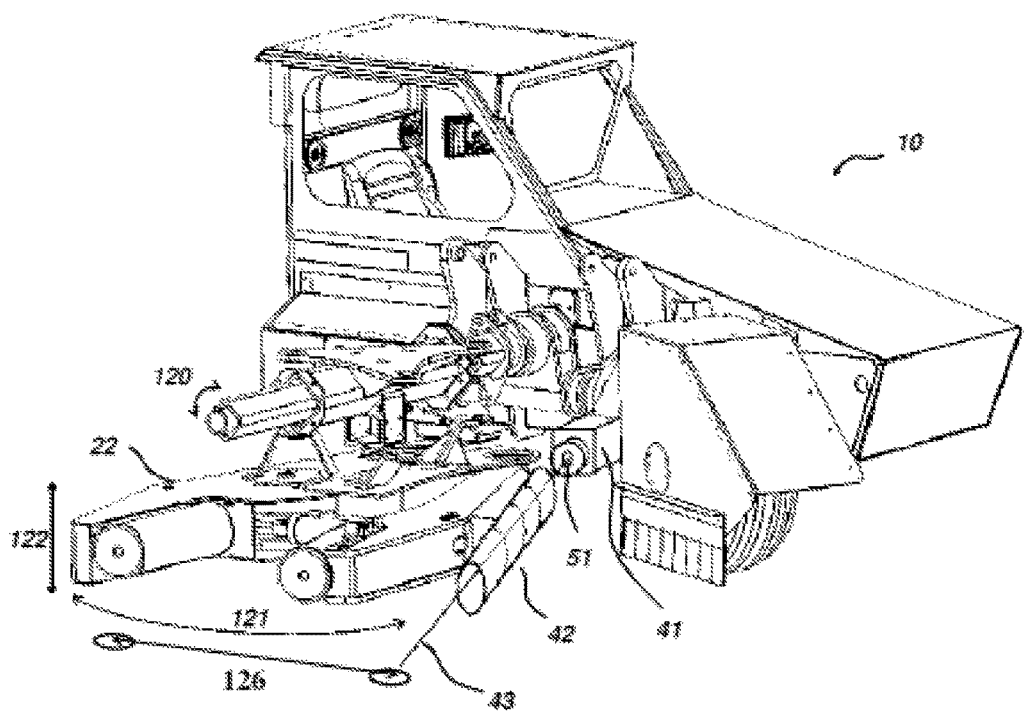
FIG. 3 is a perspective view of a section of a mechanized tree shaker with an embodiment of the distance sensor apparatus and the vegetation pushing device.

Referring now to FIGS. 1-3, a mechanized tree shaker 10 incorporating embodiments of the present invention is illustrated. FIG. 1 illustrates a perspective view of the mechanized tree shaker. FIG. 2 illustrates a top plan view of the FIG. 1 mechanized shaker, with its steering wheel cover removed. FIG. 3 illustrates a perspective of the front section of the FIG. 1 mechanized tree shaker.

As shown in FIGS. 1 and 2, the tree shaker 10 may include a body 14 enclosing a drive engine, a forwardly disposed operator's cab 18, a tree clamping and shaker head 22 that is mounted to the vehicle such that the operator can view the tree clamping and shaking process, and a single front steering wheel 26, mounted on a caster, for maneuvering the tree shaker 10. As shown in FIG. 2, in front of the front steering wheel is a rotating sweeper brush 25 mounted on a lifting pivot arm 27. The shaker head 22 is movably mounted upon an outwardly projecting support boom 30, such that the shaker head 22 may move outwardly to clamp a tree trunk and shake the tree. The shaker head 22 has two jaws 34 and 35 having shaking pads 38 and 39, respectively that are used to clamp a tree trunk and shake the tree.

As shown in FIGS. 1-3, the harvester vehicle 10 is equipped with a distance sensor apparatus 41 and a vegetation pushing member or device 42. In this embodiment, the distance sensor comprises a conventional laser distance sensor 51. The preferred laser distance sensor is commercially available from Baumer Ltd., as its model OADM 250U1101. Alternatively, the distance sensor apparatus may comprise a depth imaging camera sensor. The preferred depth imaging camera sensor is commercially available from IFM Efector, Inc., as its model O3D200. While these are the preferred brands and model numbers, other sensors similar to these may be utilized so long as they function to accomplish the intended distance sensing purpose.

Figure 9:
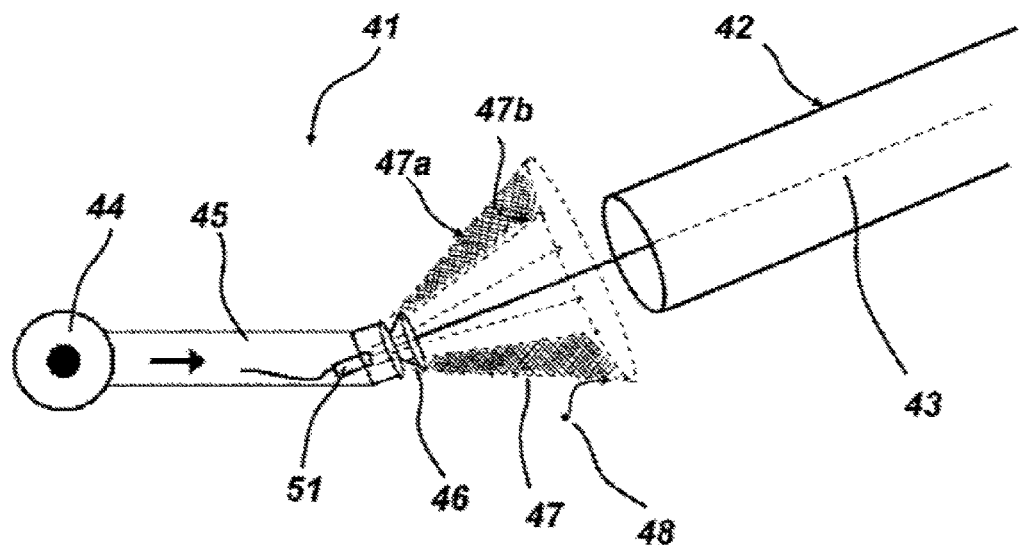
FIG. 9 is a top plan view of a distance sensor apparatus and a vegetation pushing device, the distance sensor apparatus comprising a laser sensor apparatus with an air source and a dust clearing nozzle.

The distance sensor apparatus 41 may also include a fan 44 to source flowing air, and tubing 45 to direct the air flow over the optical line of the distance sensor 51, as shown in FIG. 9. The physical structure of the vegetation pushing member or device 42 and the air stream flowing from the fan 44 establish and maintain a clear optical path for the laser beam 43 emanating from the sensor apparatus 41 to a proximate tree trunk.

As shown in FIGS. 1-3, the vegetation pushing member or device 42 is attached to the harvester. In the embodiment shown, the vegetation pushing device 42 is attached to one side of the shaker head 22, preferably positioned in a specific location in order to create a clear optical path for the laser distance sensor 51. The vegetation pushing member device 42 functions to displace vegetation including low-hanging tree branches, grass or other upward-growing vegetation which may interfere with the optical path and obscure or degrade the sensor's ability to accurately detect the tree trunk. The vegetation pushing member or device may be in the form of a bar, an angled plate or of a tube through which air can flow during operation to prevent dust from interfering and obscuring the sensor's ability to detect the tree trunk.

The distance sensor 51 is communicatively connected to a conventional programmable controller 70 which preferably utilizes signals representative of the distance from the tree to the harvester to identify the existence and location of a proximate tree relative to the sensor, the shaker head 22, another tree, etc. The controller may comprise any suitable computer and/or other processing unit, including any suitable combination of processing units, which may be communicatively coupled to one another (e.g., the controller may form all or part of a controller network), so long as the controller(s) function(s) to accomplish the intended purposes as described herein. The controller as described herein can be made by one of ordinary skill in the art without undue experimentation.

The controller 70 (shown in FIG. 1) regulates movement of the shaker head 22, and can control the pitch 122 and roll 121 of the shaker head 22 in order to establish a position suitable for sensing the next tree as shown in FIG. 3.

The controller 70 is operatively connected to and controls operation of a conventional hydraulic control system. The controller 70 is capable of executing automated propel and stop functions based on the distance information provided by the distance sensor 51. The harvester operator may engage the automatic drive by simultaneously pressing a joystick trigger button (or a similar input device) and depressing the conventional hydrostat drive pedal. For example, the harvester can begin automated forward movement while the distance sensor 51 scans for a proximate tree. The controller 70 utilizes input signals from one or more wheel encoder sensor(s) 54 in order to monitor machine displacement. When a tree is found, the controller 70 continues to propel the machine a predetermined distance 126 (shown in FIG. 3) and then halts forward movement with the shaker head 22 adjacent to the tree. The controller 70 then holds the harvester's position and the operator acknowledges the shake position by pressing a conventional shake button (not shown).

The operator then presses the joystick trigger button (or similar input device) (not shown), which sends a signal to the controller 70 to initiate an automated shaking process in which the support boom 30 moves outward towards the tree. When the shaker head 22 reaches the proximate tree as determined by the distance sensor 51 and controller 70, the controller sends a signal to halt outward movement. The jaws 34 and 35 of the shaker head then clamp and shake the tree, and then unclamp the tree and move back toward the harvester body 14 once shaking is complete. The length of time that the tree is shaken is preferably predetermined, and is an instruction residing in the controller 70.

After an automated shake process is finished, the controller 70 sends signals to propel the harvester vehicle forward. Preferably, upon traveling approximately two-thirds of a predetermined tree spacing distance, the controller sends signals to lift the pivot arm 27 and to slow forward movement of the harvester 10. The controller 70 then initiates a scanning process to monitor the output data signals from the distance sensor 51 in order to locate the next tree proximate to the machine in a conventional manner.

Figure 4:
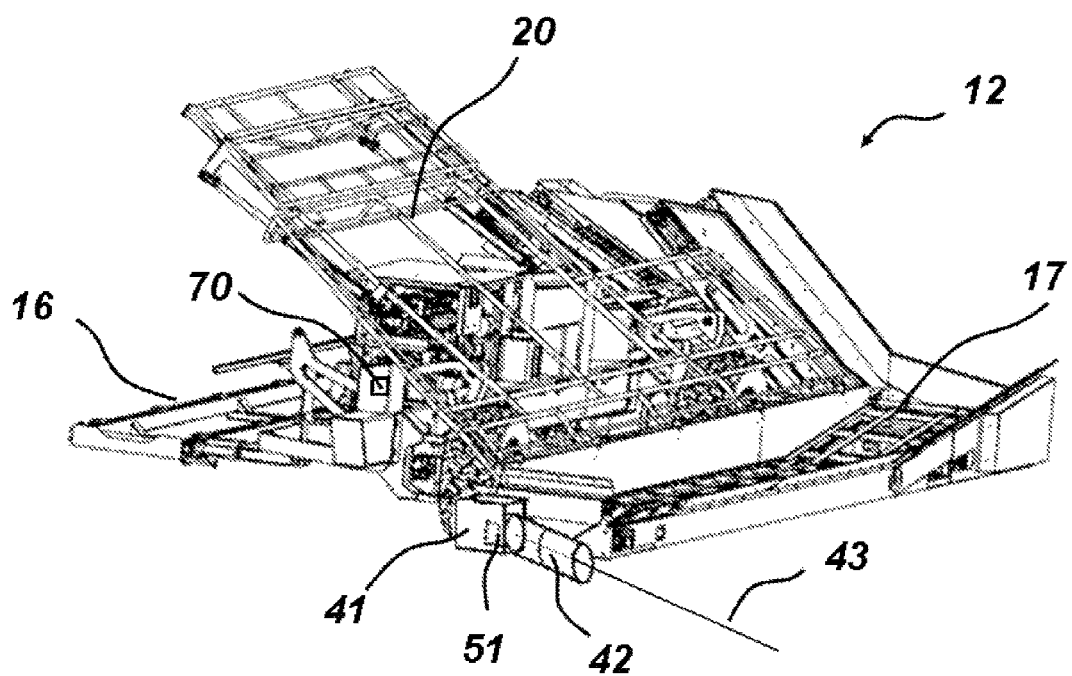
FIG. 4 is a perspective view of a catching frame receiver vehicle with an embodiment of the distance sensor apparatus and the vegetation pushing device.

FIG. 4 depicts a perspective view of a crop receiver vehicle 12 fitted with a crop bin carrier 16, a crop conveyer 17, and a catching frame 20, incorporating another embodiment of the distance sensor apparatus and the vegetation pushing device. The receiver vehicle 12 is driven on the side of a tree row that is opposite from a shaker vehicle which is also preferably equipped with a catching frame. When a tree is shaken, fruit or nuts fall off the tree onto the catching frame(s) 20, which are then are moved by conveyer(s) 17 into holding bins on the bin carrier(s) 16.

The crop receiver vehicle 12 is equipped with a distance sensor apparatus 41, preferably a laser distance sensor 51, and, preferably a vegetation pushing member or device 42 as described above. Alternatively, the distance sensor apparatus may comprise a depth imaging camera sensor as described above. While these are the preferred brands and model numbers, other sensors similar to these may be utilized so long as they function to accomplish their intended purposes.

In the FIG. 4 embodiment, the vegetation pushing device 42 is attached to the distance sensor apparatus 41 and is preferably positioned and functions to create a clear optical path for the laser distance sensor 51. The distance sensor apparatus may also include a fan 44 to source flowing air, and tubing 45 to direct the air flow over the optical path of the distance sensor 51, as shown in FIG. 9. The laser distance sensor 51 is communicatively connected to a programmable controller 70 which preferably utilizes distance and angle data to identify the existence and relative location of a proximate tree, wherein tree locations are used as references to automatically steer, propel and/or stop the vehicle. The physical structure of the vegetation pushing device 42 and the air stream flowing from the fan 44 maintain a clear optical path for the laser beam 43 emanating from the sensor apparatus 41 to a proximate tree trunk, allowing for accurate detection and location of a tree trunk relative to the vehicle and/or to other trees.

Figure 5:
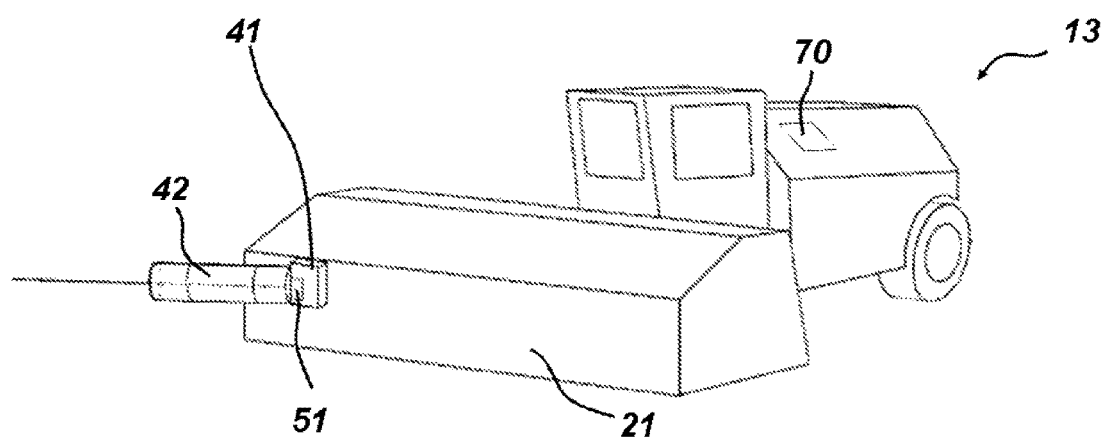
FIG. 5 is a perspective view of a nut sweeping vehicle with an embodiment of the distance sensor apparatus and the vegetation pushing device.

FIG. 5 depicts a perspective view of a nut sweeping vehicle 13 with a drive engine, an operator's cab, and a sweeper 21 that is disposed forwardly of the cab. The nut sweeping vehicle 13 is equipped with a distance sensor apparatus 41 and a vegetation pushing device 42. In this embodiment, the vegetation pushing device 42 is preferably attached to the distance sensor apparatus 41 and is preferably positioned in order to create a clear optical path for the laser distance sensor's outgoing and incoming signals. The distance sensor apparatus 41 contains laser sensor 51 which is communicatively connected to a programmable controller 70. The controller 70 may use distance and angle measurements or information to identify the existence and location of a proximate tree relative to the vehicle and/or with tree locations used to automatically steer and/or propel and stop the vehicle.

The distance sensor apparatus depicted in FIG. 5 includes a distance sensor 51 which preferably comprises a laser distance sensor as described above. Alternatively, the distance sensor apparatus may comprise a depth imaging camera sensor, as described above. While these are the preferred brands and model numbers, other sensors similar to these may be utilized so long as they function to accomplish their intended purposes. The distance sensor apparatus 41 may also include a fan to source flowing air, and tubing or other structure to direct the air flow over the optical line of the distance sensor.

Figure 6:
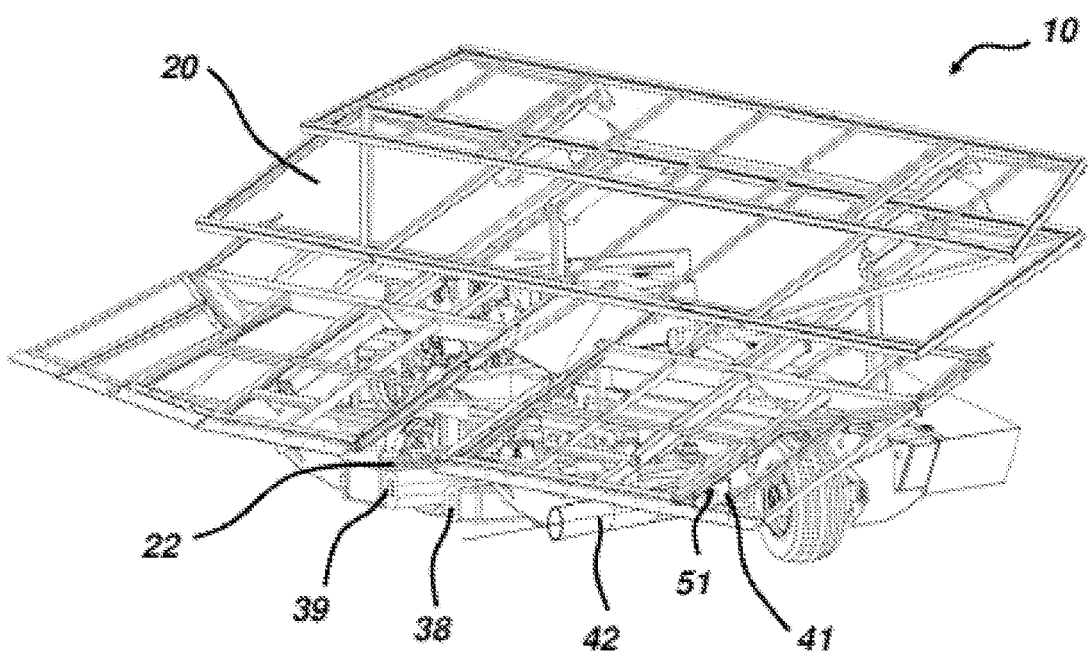
FIG. 6 is a perspective view of a mechanized tree shaker with a catching frame receiver with an embodiment of the distance sensor apparatus and the vegetation pushing device.

FIG. 6 depicts a perspective view of a mechanized tree shaker 10 with a catching frame 20, incorporating an alternate embodiment of the distance sensor apparatus 41 and vegetation pushing device 42. The tree shaker 10 is driven on the side of a tree row. When a tree is shaken, fruit or nuts fall off the tree onto the catching frame 20. The tree shaker 10 has a shaker head 22 which moves outwardly to clamp a tree trunk and shake the tree. The shaker head 22 has two jaws with shaking pads 38 and 39 that clamp onto a tree trunk when a tree is shaken.

The mechanized tree shaker 10 is equipped with a distance sensor apparatus 41 preferably including a laser distance sensor 51, and a vegetation pushing member or device 42 as described above. Alternatively, the distance sensor apparatus may comprise a depth imaging camera sensor, as described above. While these are the preferred brands and model numbers, other sensors similar to these may be utilized so long as the function to accomplish their intended purposes.

In the FIG. 6 embodiment, the vegetation pushing member or device 42 is attached to the distance sensor apparatus 41, which is attached to the base of the vehicle, and is positioned so that during operation the laser distance sensor 51 has a clear optical path to a tree trunk. The distance sensor apparatus may also include a fan 44 to source flowing air, and tubing 45 to direct the air flow over the optical path or line of the distance sensor 51, as shown in FIG. 9. The laser distance sensor 51 is communicatively connected to a programmable controller 70 which may utilize distance and other data to identify the existence and relative location of a proximate tree relative to the vehicle, wherein tree locations may be used as references to automatically steer, propel and/or stop the vehicle. The physical structure of the vegetation pushing member or device 42 and the air stream flowing from the fan 44 establish and maintain a clear optical path for the laser beam emanating from the sensor 41 to a proximate tree trunk to allow accurate detection and location of a tree trunk in relation to the vehicle, the sensor or another tree.

Figure 7:
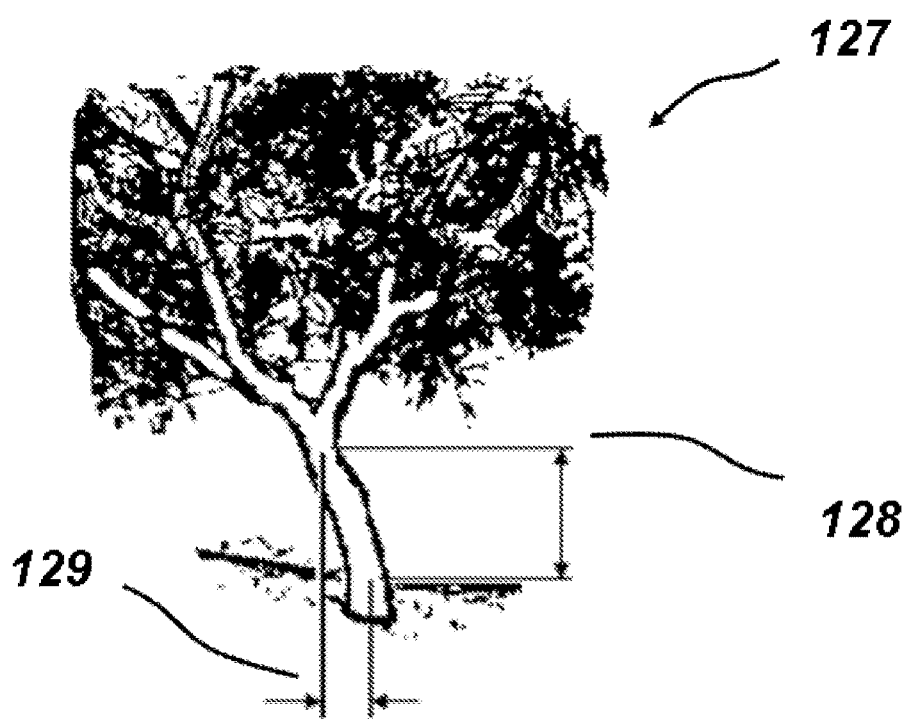
FIG. 7 is a side view of a tree growing at an angle and the appropriate vertical shake location to be located by the distance sensor apparatus.

In alternate embodiments, the controller 70 is capable of executing automated steering functions while utilizing distance information from the distance sensor 51. FIG. 7 depicts a tree 127 standing at an angle. In order for the harvester vehicle to stop at the proper horizontal shake location 129 adjacent the tree, the sensor must locate the tree at the correct vertical location 128.

Figure 8:
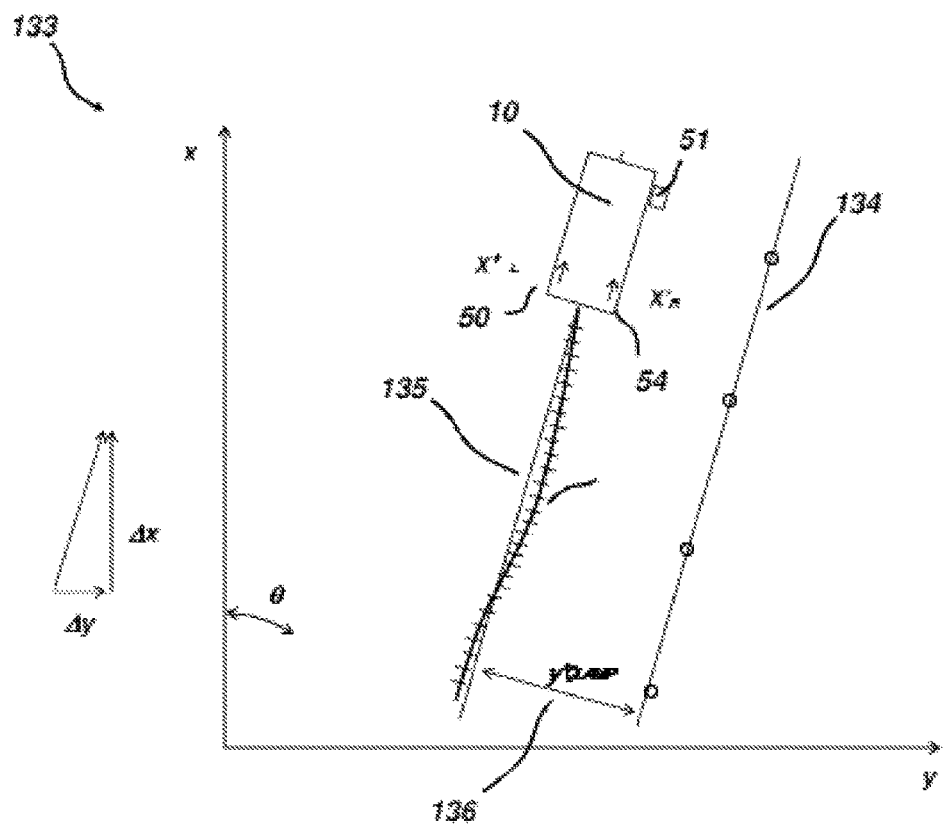
FIG. 8 is a diagram of the top view of a harvester following a course over ground which is referenced to a tree line.

FIG. 8 shows a diagram 133 of the top view of a harvester 10 following a course over ground 135 which is referenced to a tree line 134. As the harvest vehicle 10 pulls into a row of trees, the relative location of the first tree in the row may be located by the distance sensor 51. As the harvest vehicle propels forward, the controller 70 (shown in FIG. 11) determines linear displacement with wheel encoder sensors 50 and 54 and simultaneously determines angular velocity with gyroscope sensor 52. With discrete time steps, the integration of angular velocity is a summing function which allows calculation of vehicle angular displacement, as follows:

$$\theta = \Sigma \Delta \theta,$$

where $\Theta$ is the angular displacement of the vehicle and $\Delta \Theta$ is the angular velocity as measured by the gyroscope.

Changes in the vehicle two-dimensional x,y positions are calculated using the encoder distance and the vehicle angular displacement, as follows:

$$\Delta x = \cos(\theta) \frac{(x'_L + x'_R)}{2},$$

where $x'_L$, is the displacement of the left wheel and $x'_R$ is the displacement of the right wheel.

$$\Delta y = \sin(\theta) \frac{(x'_L + x'_R)}{2}$$

Summation of change in x and change in y yield the current x,y vehicle position, as follows:

$$x = \Sigma \Delta x$$

$$y = \Sigma \Delta y$$

Through this 2-dimensional dead reckoning process, the relative location of the harvester vehicle and relative locations between trees can be calculated. The controller 70 may use three or more tree locations with a least squares regression algorithm to calculate a tree line 134 in the general form, as follows:

$$A_T x + B_T y + C_T = 0,$$

where $A_T$, $B_T$, and $C_T$ are constants.

Referring to FIG. 8, the tree line may be shifted a perpendicular distance to the left $y'_{CLAMP}$ 136 to calculate a desired vehicle course over ground, as follows:

$$A_V x + B_V y + C_V = 0,$$

where: $A_V = A_T$, $B_V = B_T$, $$\text{Norm}_{AB} = \sqrt{A_V^2 + B_V^2}, \text{ and}$$

$$C_V = C_T + y'_{CLAMP} \cdot \text{Norm}_{AB},$$

if the vehicle heading is the same direction as the tree line 134 (dot product >0), or $$C_V = C_T - y'_{CLAMP} \cdot \text{Norm}_{AB},$$

if the vehicle heading is the opposite direction as the tree line 134 (dot product <0), where $y'_{CLAMP}$ is the desired perpendicular distance 136 between the tree line 134 and the vehicle desired course over ground 135.

Figure 11:
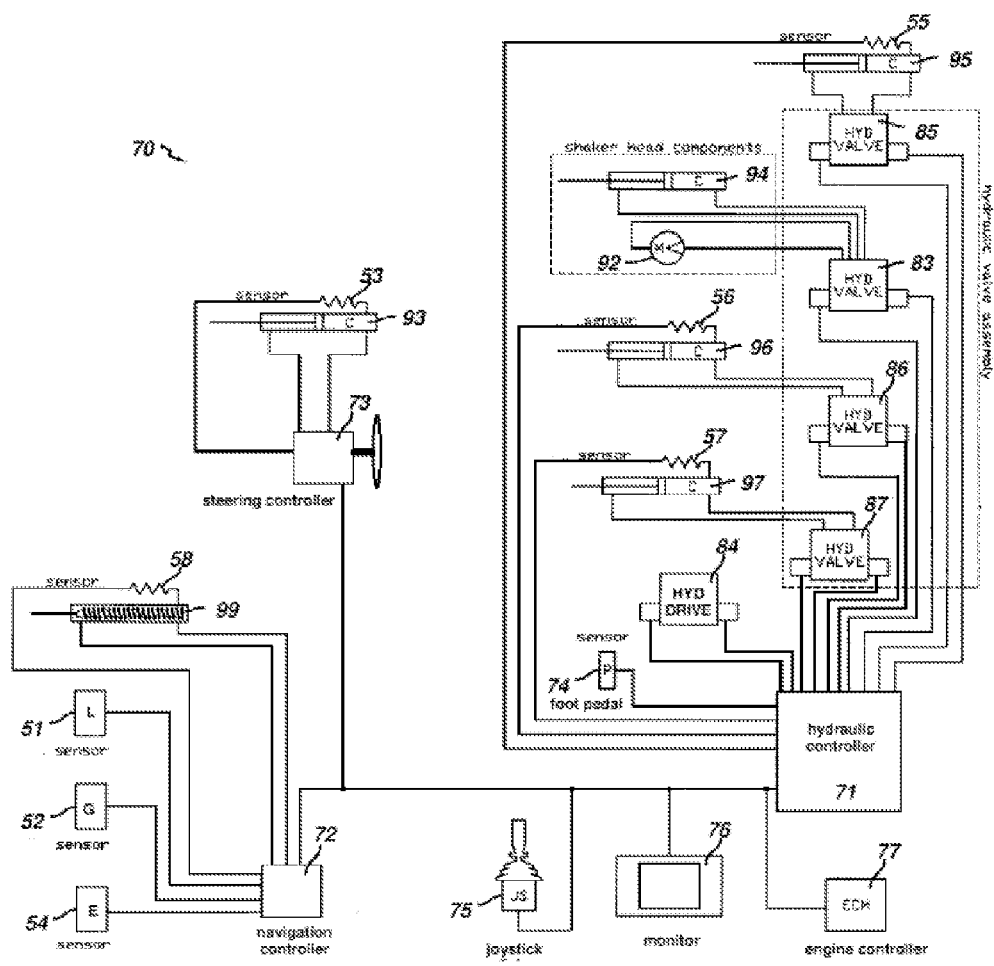

The controller 70 includes a conventional steering controller 73, schematically shown in FIG. 11, which navigates the harvester vehicle to follow the desired course over ground.

FIG. 9 illustrates a top view of an embodiment of the distance sensor apparatus 41 and vegetation pushing member or device 42. The distance sensor apparatus comprises a laser distance sensor 51, a fan 44 to source filtered flowing air, tubing 45 to direct the air flow over the optical line of the distance sensor 51. An air nozzle 46 creates a flowing air stream in the shape of an outer cone 47*a*, shown in dashed lines, and also a slower air stream in the shape of an inner jet 47*b* extending from the middle of the nozzle 46, and shown by cross-hatched lines in FIG. 9.

During operation, the laser beam 43 of the distance sensor 51 is transmitted from the sensor along the centerline of the nozzle 46 outlet in a direction away from the sensor toward a tree. The inner jet of air 47*b* begins at the discharge end of the nozzle 46 and blows directly into the device 42. The faster outer cone airstream 47*a* begins at the discharge end of the nozzle 46 and blows outside the device 42. Because areas of higher velocity have a lower pressure, nearby dust particles 48 will be drawn into the outer cone 47*a* airstream and repelled from entering the device 42. The tubing 45 may be of any shape and only exists to direct the filtered flowing air to the nozzle 46.

Figure 10:
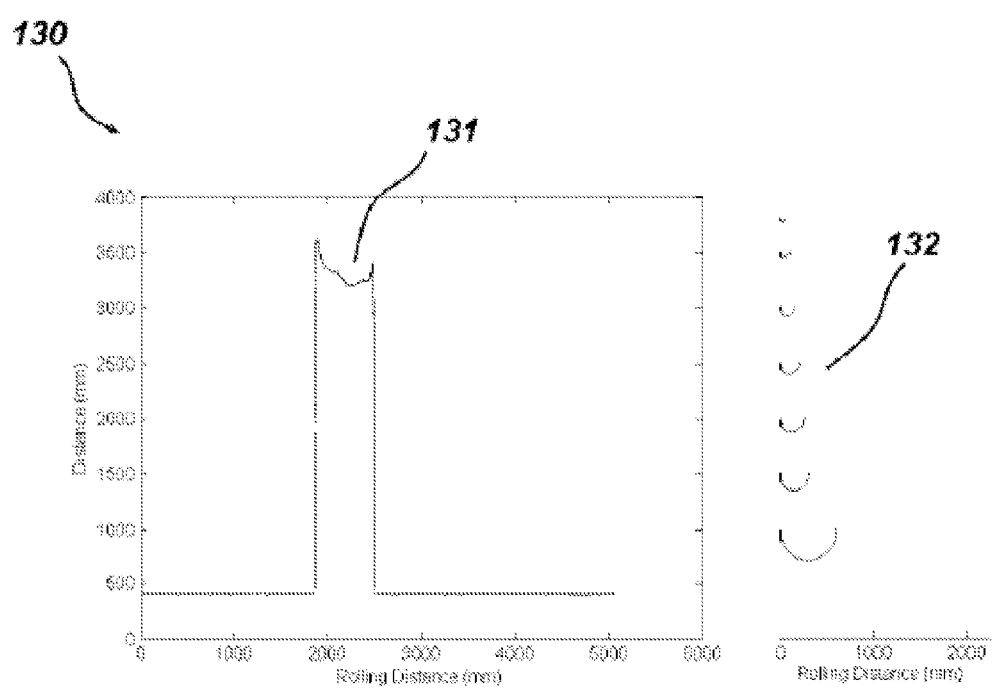
FIG. 10 is a graph containing laser distance sensor data and exemplary data curvature filters of varied tree diameters; and, FIG. 11 is a schematic diagram of a networked system of controllers for execution of tree sensing, tree shaking, vehicle propulsion, and steering.

FIG. 10 is a graph 130 containing exemplary distances to a tree trunk from a reference point, such as from the distance sensor 51, based on data generated by the distance sensor 51, plotted against the distance of travel. i.e., "rolling distance" of the harvester over the ground. When a harvester vehicle passes a tree, the distances are shown in the form of a curve 131 of the proximate tree. The controller 70 may store these data and compare the curves 131 or compare the data to a series of curve filters 132 of trees of varied diameters. A comparison algorithm will yield a result to identify when a tree trunk is in view and show its location relative to the harvest vehicle.

The controller 70 in communication with the distance sensor 51 may comprise a network of programmable controllers. FIG. 11 is a control system schematic showing controller 70 comprising a network of programmable controllers, such as but not limited to, preferably, a commercially available controller made by Danfoss, model Plus+1 system with one or more custom modules. The network 70 includes a conventional hydraulic controller 71 to control harvester propel functions, that is, motion over the ground, with a conventional hydrostat drive 84. The hydraulic controller 71 also regulates shaker head 22 movement with a head extension cylinder 95, a head clamp cylinder 94, a pitch actuating cylinder 96 and a roll actuating cylinder 97. The controller network 70 also contains a navigation controller 72 which receives and processes data from the distance sensor 51, gyroscope sensor 52 and the wheel encoder sensor 54. The navigation controller 72 controls the distance sensor's field of view using pitch 122 of the shaker head measured from potentiometer 56 as an input to regulate a linear actuator 99. The incorporated steering controller 73 actuates and measures position of a steering cylinder 93 to maintain a desired or predetermined vehicle course over ground. The engine controller 77 regulates engine speed for propel and shake processes. A joystick 75, a foot pedal 74, and a monitor 76 serve as interfaces for operator monitoring and control.

This written description uses examples to disclose the invention, including the best mode, and also to enable any person skilled in the art to practice the invention, including making and using any devices or systems and performing any incorporated methods. Although specific embodiments of the invention have been described, various modifications, alterations, alternative constructions, and equivalents are also encompassed within the scope of the invention.

The specification and drawings are, accordingly, to be regarded in an illustrative rather than a restrictive sense. It will, however, be evident that additions, subtractions, deletions, and other modifications and changes may be made thereunto without departing from the broader spirit and scope of the invention as set forth in the claims.

What is claimed is:

1. An agricultural tree harvesting vehicle comprising:
   a vehicle body enclosing a drive engine;
   an operator's cab;
   a distance sensor attached to said vehicle body and adapted to generate data representative of distance from a reference point on said vehicle body along a straight optical path to a tree trunk of a proximate agricultural tree to be harvested;
   a tree shaker head movably mounted to said vehicle body, said shaker head comprising a pair of opposed, moveable jaws;
   a vegetation pushing member directly attached to said tree shaker head and adapted to push vegetation away from said straight optical path during operation of said vehicle; and, wherein said vegetation pushing member comprises a tube.

2. The harvesting vehicle of claim 1 further including a crop conveyer and a catching frame.

3. The harvesting vehicle of claim 1 wherein said distance sensor is a laser distance sensor.

4. The harvesting vehicle of claim 1 wherein said vehicle further comprises a fan and an air nozzle through which air flows along said optical path in a direction away from said vehicle.

5. The harvesting vehicle of claim 1 further including a controller operatively connected to said engine, said shaker head and said distance sensor; said controller adapted to control motion of the vehicle over ground; and said controller adapted to control operation of said shaker head.

6. The harvesting vehicle of claim 4 wherein said air nozzle is adapted to create an outer flowing air stream in the shape of a cone and an inner flowing air stream with said outer flowing air stream of higher velocity than said inner flowing air stream velocity during operation of said vehicle.

7. The harvesting vehicle of claim 5 wherein said controller is adapted to receive data from said distance sensor to determine the distance from said vehicle to said tree.

8. An agricultural tree harvesting vehicle comprising:
   a vehicle body enclosing a drive engine;
   an operator's cab;
   a distance sensor attached to said vehicle body and adapted to generate data representative of distance from a reference point on said vehicle body along a straight optical path to a tree trunk of a proximate agricultural tree to be harvested;
   a tree shaker head movably mounted to said vehicle body, said shaker head comprising a pair of opposed, movable jaws;
   a vegetation pushing member directly attached to said tree shaker head and in the form of a tube adapted to push vegetation away during operation of said vehicle.

9. The harvesting vehicle of claim 8 further including a controller operatively connected to said engine, said shaker head and said distance sensor; said controller adapted to control motion of the vehicle over ground; and said controller adapted to control operation of said shaker head.

\* \* \* \* \*